United States Patent [19]
Ishii et al.

[11] Patent Number: 4,800,704
[45] Date of Patent: Jan. 31, 1989

[54] APPARATUS FOR ALIGNING AND PACKING FRUITS OR VEGETABLES INTO PACKAGES

[76] Inventors: Toru Ishii, 3-14, 4-chome, Takehara, Mathuyama, Ehime-Pref; Kodo Shimomura, 13-34, I-Chome, Shinhonmachi, Kochi-Pref, both of Japan

[21] Appl. No.: 133,144

[22] Filed: Dec. 14, 1987

[51] Int. Cl.⁴ ............... B65G 11/00; B65B 35/44
[52] U.S. Cl. ................................. 53/145; 53/543; 53/544; 198/458; 198/779
[58] Field of Search .............. 53/145, 146, 544, 543, 53/247, 257, 259, 537, 391; 198/458, 779

[56] References Cited
U.S. PATENT DOCUMENTS

| | | | |
|---|---|---|---|
| 2,911,775 | 11/1959 | Schwebs | 53/145 X |
| 3,453,802 | 7/1969 | Riddington | 53/544 X |
| 3,685,624 | 8/1972 | Paddock | 198/458 X |
| 4,530,435 | 7/1985 | Stohlquist | 53/544 X |
| 4,642,967 | 2/1987 | Culpepper | 198/458 X |

FOREIGN PATENT DOCUMENTS

299887 5/1929 United Kingdom ............ 53/544

Primary Examiner—James F. Coan
Attorney, Agent, or Firm—Moonray Kojima

[57] ABSTRACT

The present invention offers an apparatus which automatically aligns and packs fruits or vegetables like persimmons or tomatoes for example into containers. More particularly, the apparatus embodied by the invention is provided with means for conveying the delivered fruits or vegetables to a specific position below absorption unit following the location of fruits/vegetables feeding means, while the apparatus is also provided with absorbing unit moving between the vacuuming position of conveying means and the position for packing fruits or vegetables into a packing case placed at the packing position following the location of conveying means, and means for easily correcting the direction of fruits or vegetables as well as replacing rejected fruits or vegetables by allowing intervals to extend before and behind as well as between both side of a plurality of cups which make up conveying means at the direction-correcting position on the halfway of conveying route of conveying means.

5 Claims, 10 Drawing Sheets

APPARATUS FOR ALIGNING AND PACKING FRUITS OR VEGETABLES INTO PACKAGES

SUMMARY OF THE INVENTION

The present invention provides a novel apparatus capable of automatically aliging and packing fruits or vegetables like persimmons or tomatoes into a package. More particularly, the apparatus embodiment by the invention is provided with means for conveying the delivered fruits or vegetables to a specific position below absorption unit following the location of fruits/vegetable feeding means, and in addition, the apparatus is also provided with absorbing unit moving between the vacuuming position of conveying means and the position for packing fruits or vegetables into a package placed at the packing position following the location of conveying means, and means for easily correcting the direction of fruits or vegetables as well as replacing rejected fruits or vegetables by allowing intervals to extend before and behind as well as between both sides of a plurality of cups making up conveying means at the direction-correcting position on the halfway of conveying route of conveying means.

BACKGROUND OF THE INVENTION

Recently, an apparatus for automatically packing fruits or vegetables has been developed, which first collects a plurality of fruits or vegetables at the rear portion of the conveying direction by vibrating them on the conveyor belt in motion with their absorbable surfaces facing upside, and then, absorbs the collected fruits or vegetables by applying absorbing pads of the absorption unit connected to vacuuming device to raise their positions before eventually packing them into a package disposed in nearby location.

However, when packing large-size fruits or vegetables like persimmons or tomatoes into a container, since these are either, eliptical or not perfectly round, vibration of the conveyor belt causes them to turn about different directions. Unless these fruits or vegetables are correctly aligned in a specific direction, due to deviation between the absorbing units and the absorbable surfaces of these fruits or vegetables, the absorption units cannot correctly absorb any of them to cause the packing operation to be executed instably.

As a result, it is necessary for the apparatus developed by the prior art to manually align fruits or vegetable enroute to the absorbing position. However, since these fruits or vegetables should be packed into a package in the state closely being in contact with each other, adjacent fruits or vegetables are placed in close contact with each other. This in turn makes it difficult for workers to freely insert their fingers between these fruits or vegetables, and as a result, they cannot easily correct directions of these fruits or vegetables on the moving conveyor belt.

OBJECT OF THE INVENTION

The primary object of the present invention is to provide a novel apparatus for aligning and packing fruits or vegetables, which first allows intervals between each cup mounting a fruit or a vegetable to extend before and behind as well as between both sides at the direction-correcting position on the halfway of conveying means so that the apparatus can easily correct and invert the horizontal direction of these fruits or vegetables, replace rejected fruits or vegetables, and replenish fruits or vegetables into empty cups, thus eventually allowing the absorption unit to properly and smoothly execute the following absorption and packing operations.

Another object of the invention is to provide a novel apparatus for aliging and packing fruits or vegetables, which allows feeding means in the front position of conveying means to correctly convey fruits or vegetables having calyces in a specific condition in which calyces are preliminarily set in the manner of facing bottom and the surfaces to be vacuumed by absorbing elements of the absorption unit so that they can be set in the manner of facing upside before being delivered to the absorbing position.

Another object of the invention is to provide a novel apparatus for aligning and packing fruits or vegetables, which inverts the positions of these fruits or vegetables by causing calyces of fruits or vegetables on the moving conveyor belt to be caught by linear members set to the upper position of the conveyor unit for catching and inverting the position of calyces.

Another object of the invention is to provide a novel apparatus for aligning and packing fruits or vegetables, which is provided with absorbing elements each having thinly-formed surface coming into contact with a fruit or a vegetable for absorption and an elastic member on the back of the thinly-formed surface so that this surface can tightly come into contact with the absorbable surface of a fruit of vegetable to allow the absorbing elements to securely absorb a fruit or a vegetable with predetermined force.

A still further object of the invention is to provide a novel apparatus for aligning and packing fruits or vegetables, which is provided with a control frame controlling the displacement of the elasticity of fruits or vegetables absorbed by absorbing elements in order that the absorbed fruits or vegetables can securely be packed into a package of specific dimensions without allowing fruits or vegetables to depart from absorbing elements even when the absorbed fruits or vegetables come into contact with the upper edge of the package at the packing position.

Further objects of the invention will become more apparent from the following description of the preferred embodiments and the accompanying drawings.

BRIEF DESCRIPTION OF THE DRAWINGS

The following drawings represent a preferred embodiment of the apparatus related to the invention wherein.

DESCRIPTION OF THE PREFERRED EMBODIMENTS

Referring now more particularly to the accompanying drawings, one of the preferred embodiments of the apparatus related to the present invention is described below.

Figure 1:
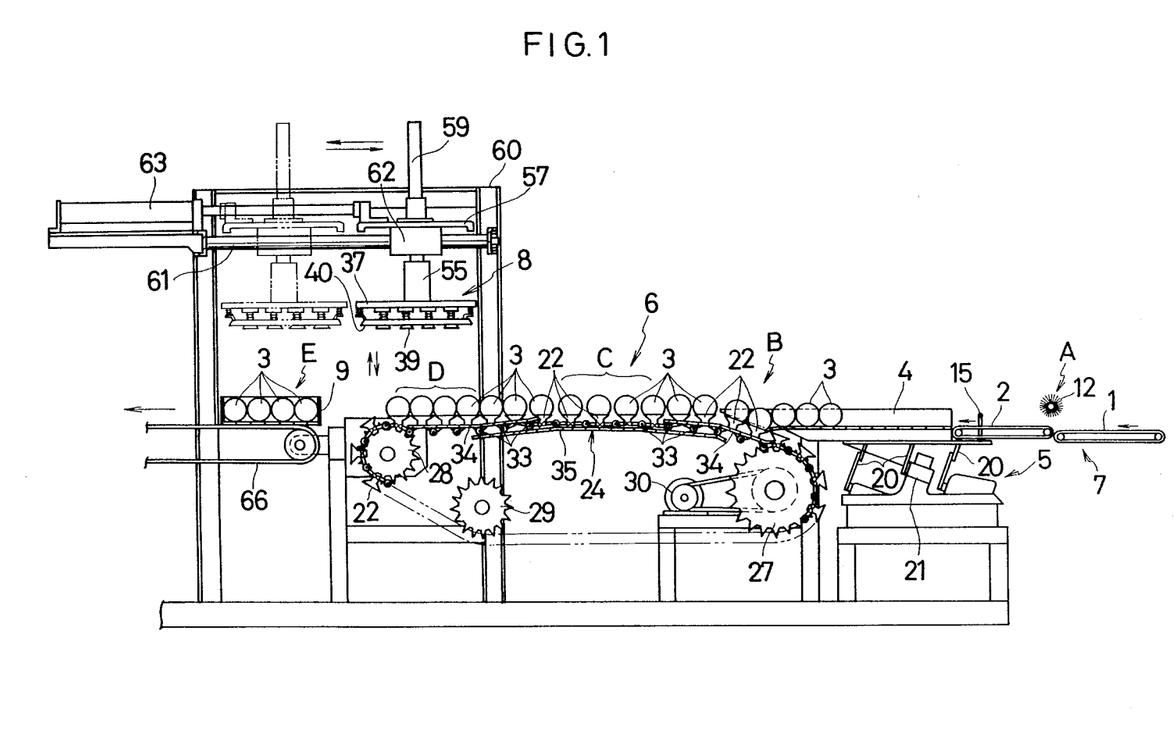
FIG. 1 is the lateral view denoting a preferred embodiment of the apparatus for aligning and packing fruits or vegetables related to the invention.
Figure 2:
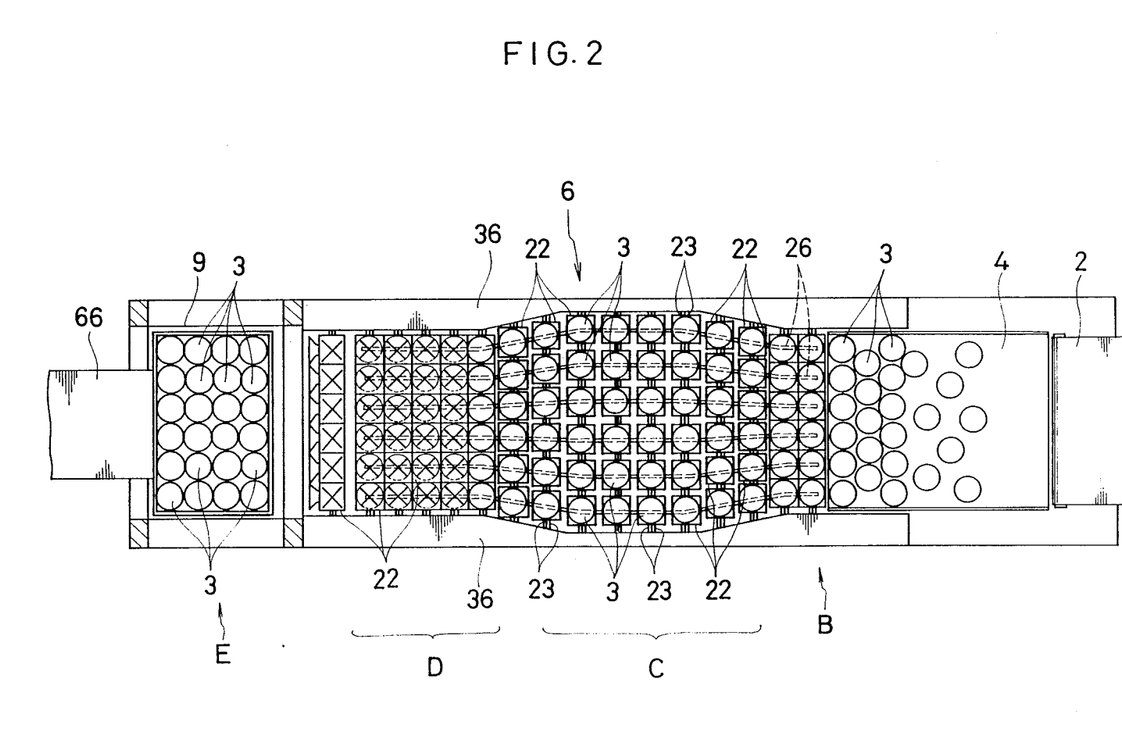
FIG. 2 is the plan denoting part of the apparatus shown in FIG. 1.

FIGS. 1 and 2 respectively denote the apparatus for aligning and packing fruits or vegetables related to the invention. The apparatus is provided with the constitution described below.

First, posture of fruits 3 or vegetables 3 delivered from conveyor belt 1 is inverted at the posture-inversion position A so that calyces 3a can face bottom altogether before being delivered onto conveyor belt 2. These fruits 3 or vegetables 3 are then conveyed to alignment feeder 4. On receipt of these, the feeder 4 is then vibrated by vibrator 5 installed below the conveyor belt 2 so that all of these fruits 3 or vegetables 3 can be aligned on the feeder 4. Next, these fruits 3 or vegetables 3 are transferred onto cups 22 secured to conveyor 6. Then, fruits 3 or vegetables 3 on cups 22 are conveyed to the vacuuming position D via direction-correcting position C by driving the conveyor 6. Next, these fruits 3 or vegetables 3 are vacuumed by absorbing unit 8 which is installed at the upper rear position of the conveyor 6. Finally, these fruits 3 or vegetables 3 are packed into package 9 which is disposed at the packing position E in the rear part of the apparatus by transferring the absorbing unit 8.

Figure 3:
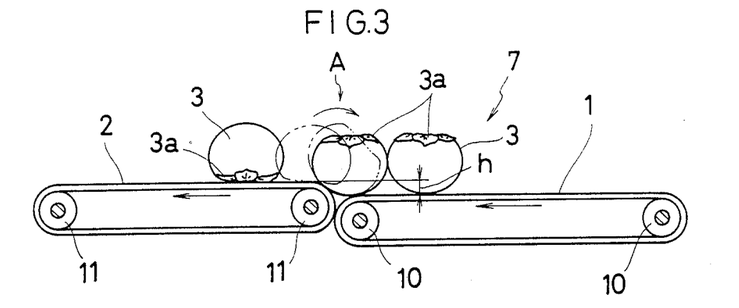
FIG. 3 is the lateral view of feeding means.

FIG. 3 denotes the constitution of the conveyor belts 1 and 2. The second conveyor belt 2 is installed at a position close to the terminating position of the first conveyor belt 1 transporting fruits 3 or vegetables 3. The second conveyor belt 2 is set at a position slightly higher than that of the first conveyer belt 1 so that height-difference h can be provided between these conveyor belts 1 and 2 for allowing the inversion of the posture of fruits 3 or vegetables 3. This makes up the posture-inversion device 7.

The first conveyor belt 1 is installed between a pair of the first rollers 10 and 10 set in the direction of the width of the conveyor belt, while the rotation of these rollers is controlled in the direction of conveying fruits 3 or vegetables 3 by a motor which is not shown in the drawings. The second conveyor belt 2 is installed between a pair of the second rollers 11 and 11 set in the direction of the width of the conveyor belt. These second rollers 11 and 11 are installed at positions slightly higher than those of the first rollers 10 and 10 (see FIGS. 3 and 4). On of these second rollers 11 and 11 at the entrance side is installed at the position closest to the first conveyor belt 1. The movement of the second conveyor belt 2 is controlled by a motor (not shown) so that it can be driven at a speed slightly faster than that of the first conveyor belt 1.

By applying the constitution mentioned above, the apparatus related to the invention allows the first conveyor belt 1 to convey fruits 3 or vegetable 3 and then causes these to turn around themselves at the height difference h when then move themselves from the first conveyor belt 1 to the second conveyor belt 2. At the same time, each of these departs from the rest before eventually being conveyed to the terminating position of the second conveyor belt 2 with the smooth surface upside for allowing the absorbing unit 8 to vacuum it and the calyx 3a facing bottom side through the posture inversion process.

As mentioned above, the apparatus related to the invention smoothly inverts the posture of fruits 3 or vegetables 3 in transit by merely providing height difference h between the first and second conveyor belts 1 and 2. Furthermore, any of these fruits 3 or vegetables 3 having flat calyx 3a facing bottom side does not turn around itself when it moves across the height difference h without changing the shifted posture, and yet, no manual labor is needed for inverting the posture of fruits 3 or vegetables 3 at all.

Figure 4:
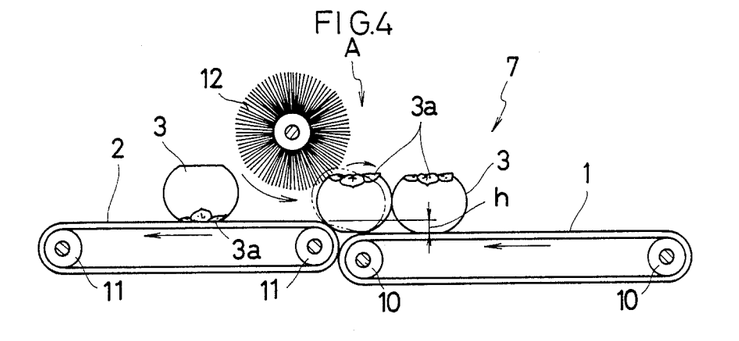
FIG. 4 is the lateral view denoting another preferred embodiment of feeding means.

In particular, as shown in FIG. 4, if fruits 3 or vegetables 3 respectively have flat upper surfaces with calyces 3a and flat and smooth bottom surfaces allowing absorptive operation to be done, a rotary brush 12 can also be provided above the entrance side of the second conveyor belt 2. In addition to the posture-inversion generated by passage of fruits 3 or vegetables 3 across the height difference h between the first and second conveyor belts 1 and 2, the apparatus can securely invert the posture of fruits 3 or vegetables 3 by providing upper surfaces of these with rotating force by allowing the rotary brush 12 to either stop its rotation or rotate itself in the arrowed direction.

Figure 5:
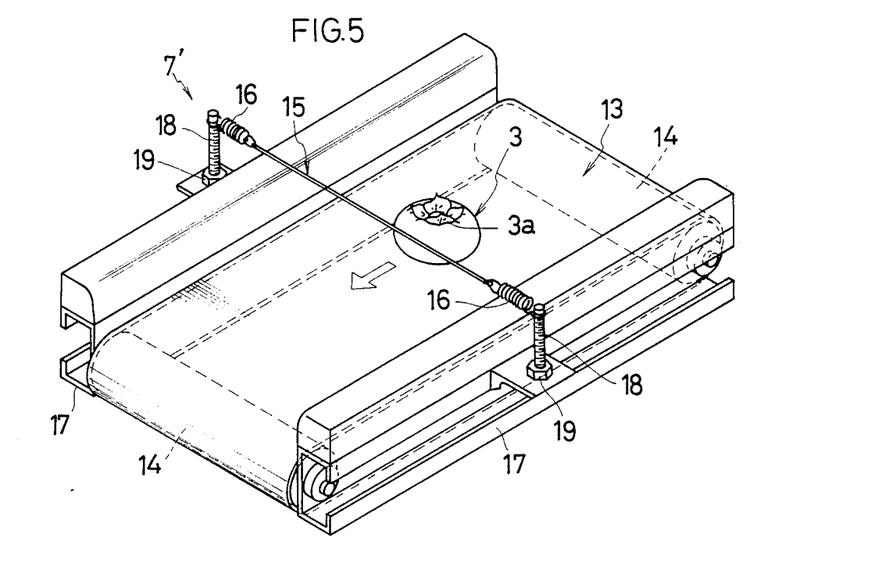
FIG. 5 is the perspective view denoting another preferred embodiment of feeding means.
Figure 6:
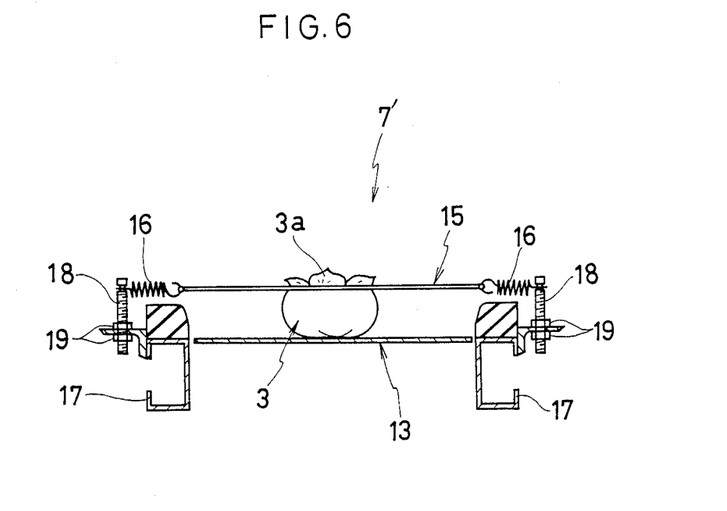
FIG. 6 is the horizontal sectional view of feeding means shown in FIG. 5.

It is also possible for the apparatus related to the invention to use another posture-inversion device 7' shown in FIGS. 6 through 9 in place of the posture-inversion device 7 which applies the height difference h provided between the first and second conveyor belts 1 and 2. As shown in FIGS. 5 and 6, the replaceable posture-inversion device 7' is substantially made of a plant conveyor 13 conveying fruits 3 or vegetables 3, which is set between a pair of rollers 14 and 14 installed in the front and rear parts and driven in the arrowed fruit-conveying direction by a motor (not shown).

This preferred embodiment provides a linear member 15 made of either a piano wire or a thin plastic yarn for example at a specific height position at which it can be engaged with the calyx 3a of a fruit 3 or a vegetable 3 on the conveyor belt 13. The linear member 15 is secured to the upper ends of screw-bars 18 and 18 erected on guide frames 17 and 17 on both sides of the conveyor belt 13 via springs 16 and 16 or elastic rubber members secured to the upper portions of screw-bars 18 and 18 on both sides. Each of these screw bars 18 and 18 is vertically engaged with each of guide frames 17 and 17, while the positions of these guide frames 17 and 17 are fixed by fastening nuts 19 and 19 which respectively sandwich these guide frames 17 and 17 of screw bars 18 and 18 between the upper and bottom surfaces. The height of the linear member 15 can properly be adjusted by loosening these nuts 19 and 19.

After selecting those fruits 3 or vegetables 3 according to grades so that the height of these can correspond to each other, these selected fruits or vegetables 3 are then mounted on the conveyor 13 which is driven in the arrowed conveying direction, calyces 3a of these fruits 3 or vegetables 3 are caught by the linear member 15 installed above the conveyor 13 as shown in FIG. 4.

Figure 7:
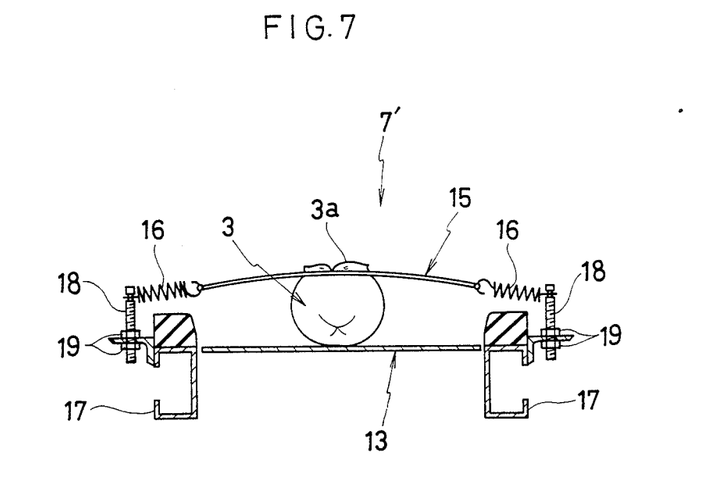
FIG. 7 is the sectional view of feeding means denoting the inversion of the position of a fruit in transit.
Figure 8:
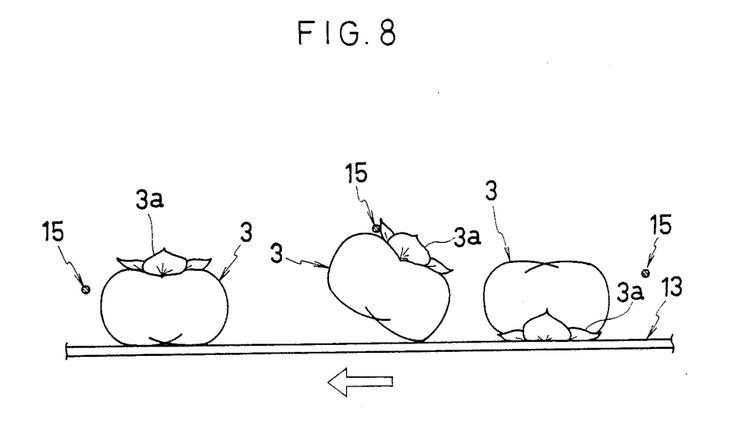
FIG. 8 is the lateral view denoting the upside-down inversion of a fruit executed by the apparatus related to the invention.

Next, as shown in FIGS. 7 and 8, when the linear member 15 bends itself as springs 16 and 16 respectively extend themselves, posture of fruit 3 is allowed to invert itself. At the same time, since the smooth surface of fruit 3 or vegetable 3 is shifted in the conveying direction by the conveyor 13, the posture of fruit 3 or vegetable 3 is then inverted to allow the smooth surface to turn upside so that it can e vacuumed by the absorbing unit 8, and then, the posture-inverted fruit 3 or vegetable 3 is conveyed to the rear exit of the conveyor 13.

Figure 9:
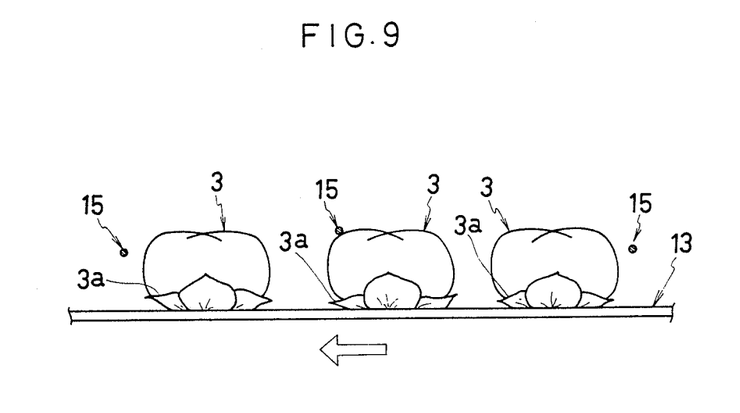
FIG. 9 is the lateral view denoting operation for conveying fruits in normal posture.

On the other hand, as shown in FIG. 9, when fruit 3 or vegetable 3 with calyx 3a facing bottom side just passes through the linear member 15, springs 16 and 16 respectively extend themselves to cause the linear member 15 to bend itself, thus allowing fruit 3 or vegetable 3 to pass through it. This in turn causes the linear member 15 to slip over the smooth surface of fruit 3 or vegetable 3 so that no inversion can take place with the posture of fruit 3 or vegetable 3, thus eventually allowing fruit 3 or vegetable 3 to be carried forward with the absorbable surface facing upside.

As described above, the preferred embodiment of the apparatus related to the invention securely inverts the posture of fruit 3 or vegetable 3 with absorbable surface facing upside by merely causing calyx 3a of fruit 3 or vegetable 3 to be caught by the linear member 15 installed above the surface of the conveyor 13. This allows the apparatus to simplify the mechanism for inverting the posture of fruits 3 or vegetables 3, and yet, the apparatus can automatically and correctly invert the posture of fruits 3 or vegetables 3.

Furthermore, posture of any fruit 3 or vegetable 3 with calyx 3a facing bottom side cannot be inverted by the linear member 15, and as a result, fruit 3 or vegetable 3 can be conveyed in the absorption-ready posture. Invertion of posture is applied only to those fruits 3 or vegetables 3 with calyces 3a facing upside, thus effectively dispensing with manual posture-inversion work otherwise needed before starting with the packing process.

It is also possible for the apparatus related to the invention to make up a complex posture-inversion device by effectively combining the posture-inversion device 7 and 7' shown in FIGS. 3 through 5 so that the complex posture-inversion device can be installed to the preceding stage of the fruit-alignment feeder 4.

The vibrator 5 shown in FIG. 1 connects the edges of stays 20 and 20 secured to the back surface of the feeder 4 to eccentric positions of the first motor and other parts. On the other hand, the feeder 4 is installed in such a condition in which the feeder 4 slightly inclines itself against conveyer 6.

As shown in FIGS. 1 and 2, the conveyor 6 is provided with a plurality (6 units for example) of cups 22 of cups 22 made from plastic material for receiving fruits 3 or vegetables 3 in the direction of the width of the conveyor belt. A pair of shafts 23 and 23 are installed in parallel with each other in the horizontal direction below these plastic cups 22, while these shafts 23 and 23 are installed between a pair of chains 24 and 24 which are set to both sides of the apparatus. Furthermore, these shafts 23 and 23 are installed in the lengthwise direction of these chains 24 and 24 at specific intervals. This constitution allows a number of plastic cups 22 (which make up a unit with 4 cups for example) to be arranged in multiple arrays.

Figure 10:
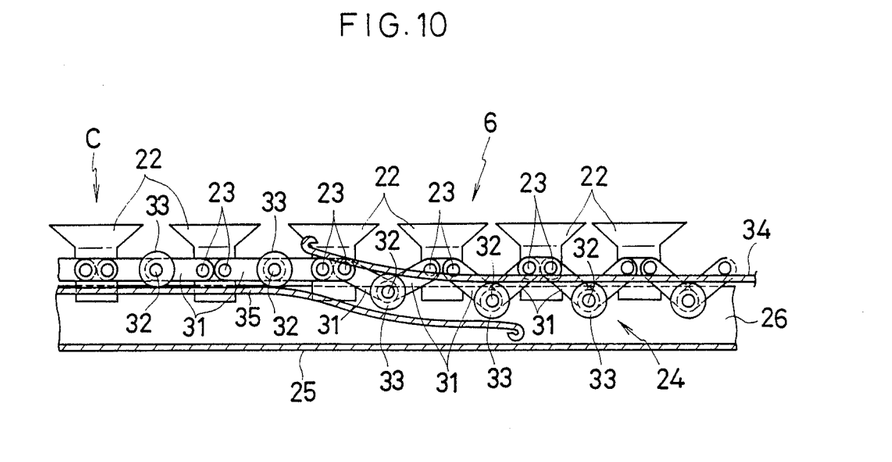
FIG. 10 is the lateral view of the essential part of the fruits/vegetables conveying belt.
Figure 11:
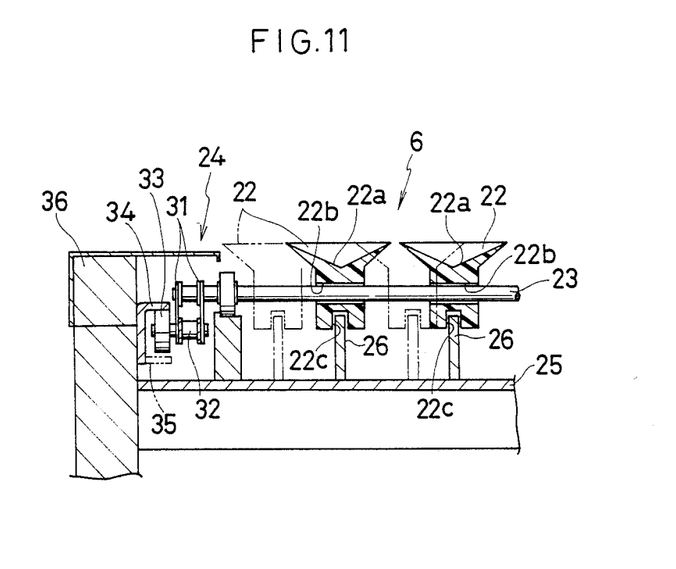
FIG. 11 is the vertical sectional view of the essential part of fruits/vegetables conveyor belt shown in FIG. 10.

As shown in FIGS. 10 and 11, each of these plastic cups 22 makes up convex 22a for receiving fruit 3 or vegetable 3 in the center of the upper surface, while each of these cups 22 is provided with a pair of through holes 22b and 22b in the lower lateral surface in parallel with each other. A pair of shafts 23 and 23 are horizontally installed through those holes 22b and 22b, thus allowing each of these cups 22 to be horizontally mounted and move itself in the direction of these shafts 23 and 23.

A plurality of grooves 22c are provided on the bottom surface of each cup 22 so that each groove 22c can cross the direction of the installed shaft 23 at right angle. Each of these grooves 22c is engaged with the vertical guide members 26 erected on the bottom plate 25 beneath the conveyor 6.

As shown in FIG. 1, a pair of chains 24 and 24 are installed between the first sprocket 27 secured to the inclined lower portion of the feeder 4 via shaft and the second sprocket 28 secured to the lower portion of the vacuuming position D of the absorbing unit 8 via shaft to allow the intervals before and behind the shaft 23 to freely extend and contract as required. The third sprocket 29 is engaged with the bottom portion of chain 24. The first sprocket 27 drives the conveyor 6 in the conveying direction in conjunction with the second motor installed alongside.

As shown in FIGS. 10 and 11, in conjunction with a pair of chains 24 and 24, two pieces of roller links 31 and 31 are installed to edges of shafts 23 and 23 which are respectively installed through cups 22. Pins 32 are inserted through the edges of these roller links 31 and 31 to allow these roller links to freely fold themselves. In addition, guide rollers 33 are installed to the outer edges of these pins 32 so that these guide rollers 33 can freely rotate themselves.

Also, as shown in FIG. 1, rail-link contraction-control guide members 34 and 34 are respectively installed to the fruit-mounting position B of the entrance side of chain 24 and also to the position above the vacuuming position D of the terminating side in order to control the tuning position of these guide rollers 33 engaged with chain 24 so that the turning position can be held lower than the shaft (23)-installed position. In addition, another rail-like extension-control guide member 35 is installed below the chain-center direction-correcting position C in order to control the turning position of the guide rollers 33 so that the turning position can linearly match the position of shaft 23. Both of these contraction and extension control guide members 34 and 35 are secured to guide frames 36 and 36 on both sides of the apparatus by means of welding.

As shown in FIG. 2, the vertical guide member 26 is erected on the bottom plate 25 which is installed below the fruit-mounting side of the conveyor 6.

A total of 6 pieces of vertical guide members 26 corresponding to the number of cups 22 disposed in the direction of the width of the conveyor 6 are erected so that the width of the conveyor belt 6 gradually expands from the entrance side to the middle portion and gradually contracts in the direction of the terminating side. The upper edges of these vertical guide members 26 are engaged with grooves 22c of cups 22 so that these cups 22 can freely move themselves.

Intervals of the vertical guide members 26 are arranged in order that the widths of the first and last ranks of cups 22 at positions B and D shown in FIG. 2 are respectively narrow, whereas those cups 22 in those ranks in the interim direction-correcting position C are respectively disposed in the width wider that those of the positions B and D.

The absorbing unit 8 vacuuming fruits 3 or vegetables 3 at the vacuuming position D for delivery to the packing position E is provided with the constituents shown in FIGS. 1 and 12 through 14. The absorbing unit is substantially comprised of square frame 37, a plurality of horizontal crosspieces 38, a plurality of absorbing elements 39 secured to these horizontal crosspieces 38, and control frame 40 externally surrounding these absorbing elements 39, respectively.

Figure 12:
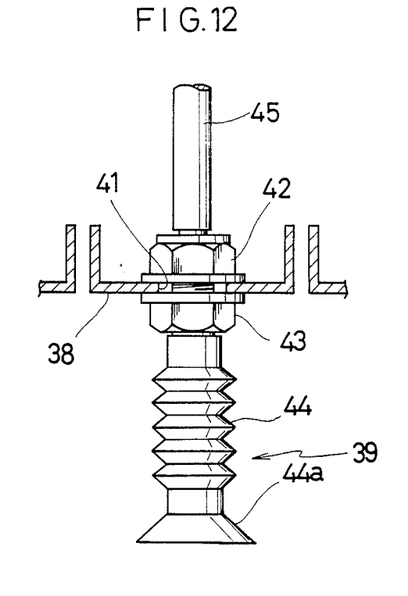
FIG. 12 is the lateral view denoting the structure of members supporting absorbing elements.

A certain number of absorbing elements 39 are installed to the horizontal crosspieces 38 in correspondence with the quantity of fruits 3 or vegetables 3 to be packed into a package, while the number of absorbing elements 39 corresponds to the number of the rank to be packed, whereas the number of the horizontal crosspieces 38 corresponds to the number of file to be packed, respectively.

As shown in FIG. 12, each of these horizontal crosspieces 38 makes up grooves 41 connected to each other in the horizontal direction in the center. Member 42 supporting the absorbing elements 39 is installed in the manner in which it can freely move inside of the groove 41, while the member 41 is secured to a specific position with nut 43.

The absorbing elements 39 are respectively made from synthetic rubber for example, while elastic bellow 44 is formed in the middle portion, while the upper edge of the bellow 44 is inserted into and fixed to the bottom edge of the supporting member 42. The upper edge of the supporting member 42 is connected to proper vacuuming device and a switching control valve (not shown) via vacuuming hose 45.

Figure 14:
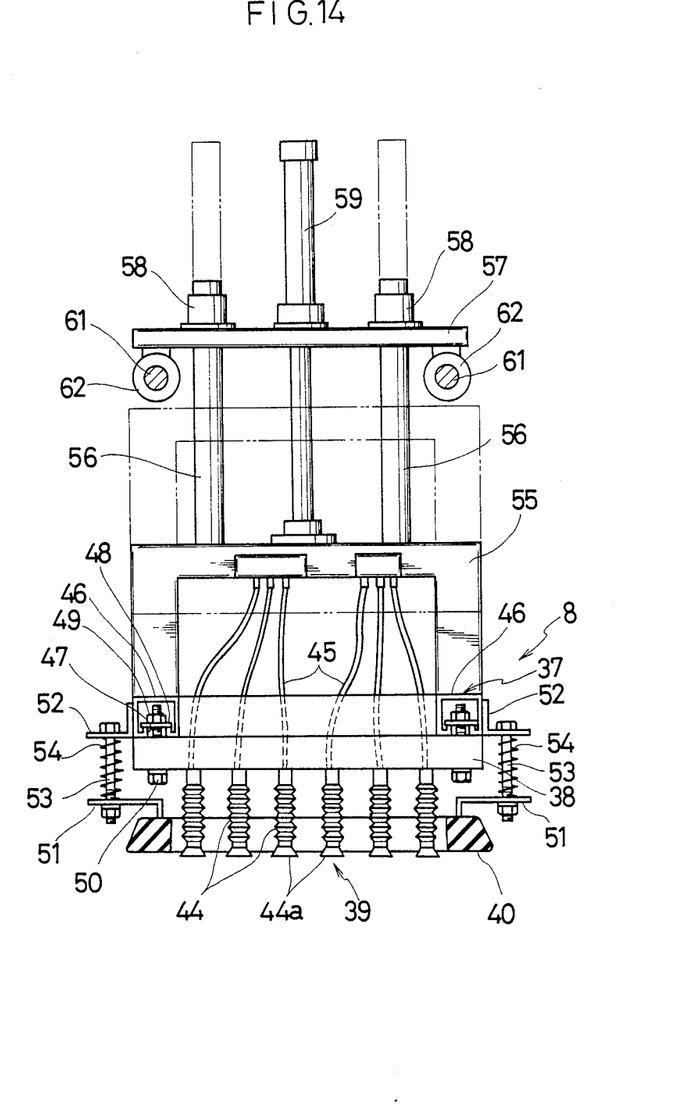
FIG. 14 is the front view of the absorbing unit.

Both ends of each horizontal crosspiece 38 are fixed in order that intervals between adjoining crosspieces can properly be adjusted against frame members 46 and 46 being opposite from the frame member 37. More particularly, as shown in FIG. 14, grooves 47 and 47 are respectively formed below the bottom surfaces of the frame members 46 and 46. Sliders 48 and 48 are inserted into the upper surfaces of these grooves 47 and 47 so that these sliders can slide themselves. Nuts 49 and 49 are secured to the upper surfaces of these sliders 48 and 48. The horizontal crosspiece 38 is fixed in position by fastening bolt 50 penetrating the horizontal crosspiece 38 against nut 49. The position of the horizontal crosspiece 38 can properly be adjusted by loosening the nut 49 in the direction of the groove 47. Consequently, by adequately adjusting the position of the horizontal crosspiece 38 in the vertical direction and the position of the absorbing elements 39 in the horizontal direction, it is possible for the operator of the apparatus to optionally choose disposition of these absorbing elements 39 from either multiple square formation or multiple zigzag-like formation.

The control frame 40 is made from square-shaped elastic material like rubber for example, which is provided with a specific internal dimension enough to prevent the elasticity of the absorbing elements 39 disposed in the external position of arrays from displacing those absorbing elements 39 to such positions where no packing operation can be done. A pair of L-shaped plates 51 are outwardly installed to the upper surface of the control frame 40, while these L-shaped plates 51 are secured to pieces 52 of the frame member 37 with bolts 53. Coil springs 54 respectively generate force in the downward direction to prevent the bottom surface of the control comes into any stiff object like package 9.

Gate-shaped frame 55 is secured to the upper surface of the frame member 37 of the absorbing unit 8, while a pair of sliding rods 56 and 56 are erected on both sides of the upper surface of the gate-shaped frame 55. These sliding rods 56 and 56 respectively penetrate cylindrical guide members 58 and 58 installed to the movable plate 57 in the upper position so that both of these sliding rods 56 and 56 can move themselves in the vertical direction. Piston rod of the first oil-pressure cylinder 59 secured to the movable plate 57 is engaged with the gate-shaped frame 55. The absorbing unit 8 is vertically operated by the movement of the first oil-pressure cylinder 59.

The movable plate 57 is supported by a pair of sliding rods 61 and 61 installed between the front and rear positions of the main frame 60 shown in FIG. 1 via cylindrical guide members 62 and 62 so that the movable plate 57 can slide itself back and forth as required. Piston rods of the second oil-pressure sylinder 63 installed to the rear portion of the main frame 60 is engaged with the movable plate 57. By operating the second oil-pressure cylinder 63, the movable plate 57 travels itself back and forth to allow the absorbing unit 8 to move itself between the vacuuming position D and the packing position E.

Figure 13:
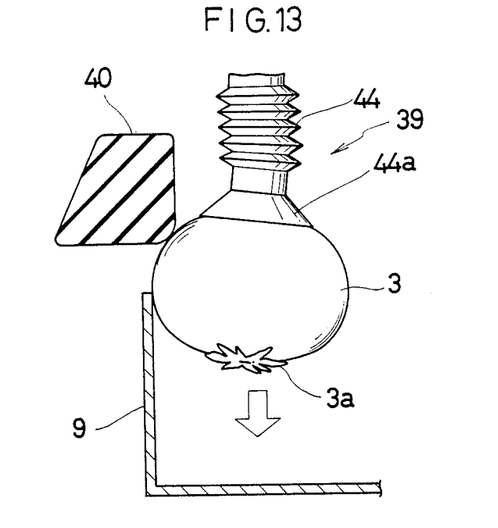
FIG. 13 is the diagram denoting the state of packing a fruit into a package.

FIGS. 12 through 14 briefly illustrate the constitution of the absorbing element 39. See FIGS. 15 through 17 for detailed constitution of this absorbing element 39.

Figure 15:
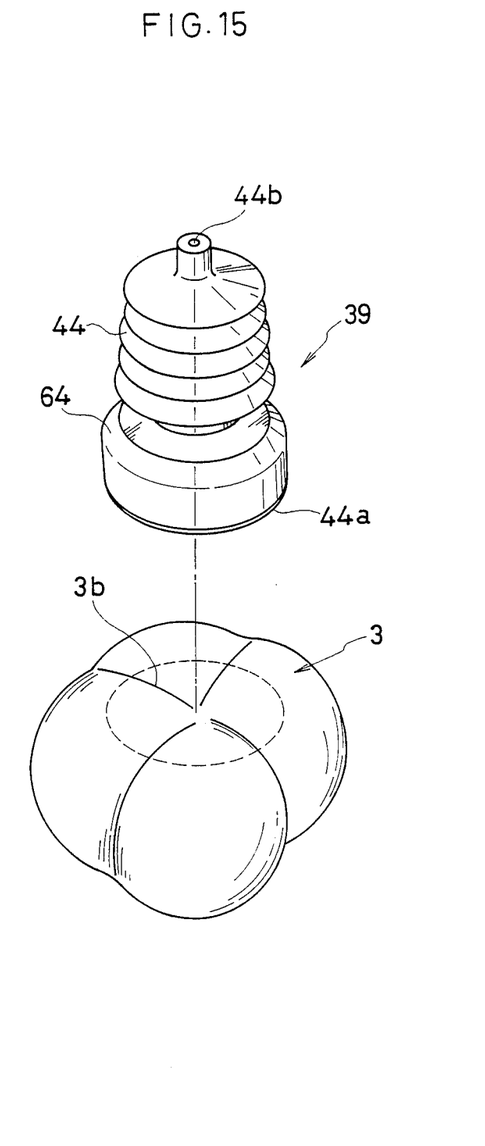
FIG. 15 is the perspective view of the absorbing element.
Figure 16:
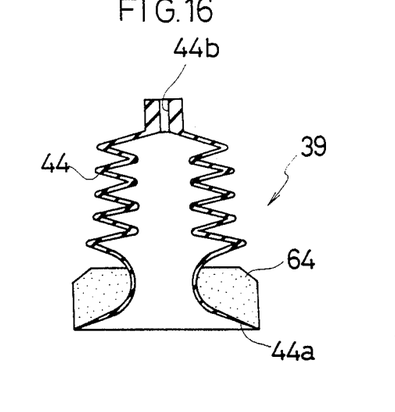
FIG. 16 is the sectional view of the absorbing element.

The bottom portion of the bellow 44 made from synthetic rubber is opened in the bell-bottomed shape to make up vacuum and contact surface 44a. This surface 44a is provided with a thin thickness so that the surface 44a can fully accommodate itself to those surfaces of fruits or vegetables to be processed by the apparatus. In addition, elastic member 64 made from soft synthetic rubber or sponge is set to the back surface of surface 44a.

Figure 17:
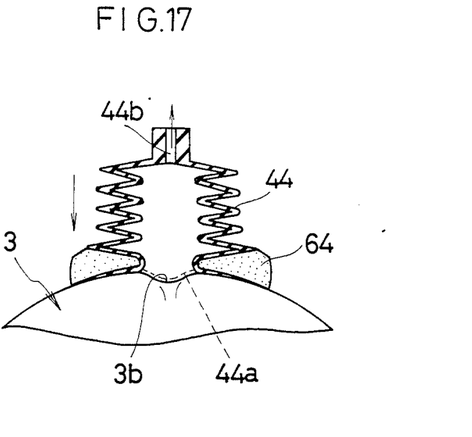
FIG. 17 is the schematic diagram denoting the state of activating the absorbing element to absorb a fruit.

Operation of the absorbing element 39 having the above constitution for vacuuming fruits 3 or vegetables 3 are described below. As shown in FIG. 17, as soon as the absorbing element 39 presses against fruit 3 on the cup 22, the vacuum and contact surface 44a of the bellow 44 comes into contact with it, and simultaneously, the elastic member 64 presses against fruit 3 with force generated by the bottom of the bellow 44 of the absorbing element 39 to allow the surface 44a to press itself against the hollow portion 3b of smooth surface of fruit 3. At the same time, the surface 44a uniformly applies pressure onto absorbable surface of fruit 3 so that the surface 44a can tightly adhere to the absorbable surface of fruit 3 without gap at all. Simultaneously, atmospheric air is fully vacuumed from the absorbing element 39 via the upper outlet 44b and the vacuuming hose 45 to allow fruit 3 in cup 22 to securely be absorbed by specific vacuuming force. This allows the predetermined quantity of fruits 3 to be conveyed to the designated position smoothly.

Next, functional operation of the apparatus related to the invention is described below.

First, a certain number of fruits 3 or vegetables 3 are mounted on the first conveyor belt shown in FIGS. 1 and 3. When fruits 3 or vegetables 3 move themselves across the height difference h between the first conveyor belt 1 and the second conveyor belt 2, these fruits 3 or vegetables 3 turn round themselves. This allow fruits 3 or vegetables 3 to invert their posture at the inversion position A so that smooth surfaces of these face upside. While fruits 3 or vegetables 3 remain in the state with smooth surfaces facing upside, these are then mounted onto the second conveyor belt 2 before sequentially being forwarded. Those fruits 3 or vegetables 3 with calyces 3a facing bottom side do not turn around themselves when passing through the height difference without changing this normal posture, thus allowing the inversion process to be done effectively.

When the vibrator 5 is activated, those fruits 3 or vegetables 3 delivered from the second conveyor belt 2 onto the fruit-alignment feeder 4 are sequentially aligned in the state with their smooth surfaces facing upside. These are sequentially delivered to the inclined portion of the feeder 4, and then, after they arrive at the mounting position B, they are respectively transferred to the first rank cups 22 disposed at the inclined portion of the feeder 4 as shown in FIG. 2.

When this condition is present, as shown in FIG. 10, the rotating position of the guide rollers 33 engaged with chain 24 are controlled by the contraction-control guide member 34 so that the rotating positions can be held below the position of the shafts 23. As a result, chain 24 contracts itself, thus contracting intervals of shafts between the front cup 22 and the rear cup 22. This causes the intervals between cups 22 in the front and rear ranks to be contracted in the fruit-conveying direction. At the same time, intervals between cups 22 in the width direction are contracted by the vertical guide members 26 erected on the bottom plate 25, and thus, as shown in FIG. 2, fruits 3 or vegetables 3 delivered from the feeder 4 are transferred to cups 22 of the first rank gathering in the center of the conveyor 6.

When the initial packing operation is activated, sensor means (not shown) detects that fruits 3 or vegetables 3 are transferred to cups 22 of the first rank. This automatically activates the movement of the conveyor 6, thus allowing fruits 3 or vegetables 3 to be, sequentially fed to cups 22 of the following ranks conveyor 6 remains operative until fruits 3 in cups 22 of the first rank arrive at the terminating position of the conveyor path.

When the above operations are underway, as shown in FIG. 10, the rotating positions of the guide rollers 33 engaged with chain 24 are controlled by the extension-control guide member 35 at the fruit direction correcting position C in the center of the apparatus in order that the rotating positions of these rollers 33 can be held at a level flush with that of shafts 23. As a result, chain 24 stretches itself to cause intervals of shafts 23 and 23 between cups 22 in the front and rear ranks to spread, thus causing the intervals between cups 22 in the front and rear ranks to spread in the fruit-conveying direction. At the same time, cups 22 spread themselves in the direction of the conveyor belt by moving over shafts 23 and 23 by applying force of those vertical members 26 erected on the bottom plate 25.

Intervals between each cup 22 mounting fruit 3 or vegetable 3 spread in the direction of the conveyor belt (i.e., to the left and to the right) and also in the fruit-conveying direction (i.e., in the lengthwise direction) at the fruit direction correcting position C of the conveyor 6 in the manner mentioned above. This allow gap to be generated between adjoining fruits 3 or vegetables 3 to allow operator to easily correct the directions of fruits 3 or vegetables 3 or replace rejected one as required. In addition, operator can also manually invert the position of any fruit 3 having calyx 3a facing upside or replenish fruits 3 into empty cups 22 as required.

The rotating positions of the guide rollers 33 engaged with chain 24 are controlled by the contraction-control guide member 34 at the vacuuming position D in the rear part of the apparatus so that the rotating positions of these rollers 33 can be held below that of shaft 23. This causes chain 24 to contract itself, and at the same time, since intervals between the vertical guide members 26 on the bottom plate 25 contract, cups 22 gather themselves within intervals in which fruits 3 or vegetables 3 can securely be vacuumed while preserving correct posture.

As soon as those cups 22 of the first rank each mounting fruit 3 or vegetable 3 arrive at the vacuuming position D of the conveyor 6, sensor means (not shown) detects this and stops the movement of the conveyor 6.

Next, after visually confirming that the entire cups (24 cups for example in this preferred embodiment) of four ranks (corresponding to one-package lot) at the vacuuming position D are filled with fruits 3 or vegetables 3, operator then depresses the packing-start switch (not shown) to lower the position of the piston rod of the first oil-pressure cylinder 59, thus allowing the entire absorbing unit 8 to descend its position until reaching the vacuuming position D of the conveyor 6. As soon as fruits 3 or vegetables 3 corresponding to one-package lot are securely vacuumed by the absorbing elements 39, the piston rod of the first oil-pressure cylinder 59 ascend its position to also raise the position of the entire absorbing unit 8 until it stops at the predetermined position. Simultaneously, the second oil-pressure cylinder 63 is activated to transfer the entire absorbing unit 8 to the packing position E.

Next, the first oil-pressure cylinder 59 descends itself to lower the position of the absorbing unit 8 to deliver the vacuumed fruits 3 or vegetables 3 into the package 9. Then, the system controller releases the vacuuming device of the absorbing elements 39 from the vacuuming operation so that fruits 3 or vegetables 3 can be released from the absorbing elements 39, thus eventually completing the entire fruit packing operation.

Then, the package 9 storing fruits 3 or vegetables 3 is delivered to the following location by belt 66. At the same time, the absorbing unit returns to the original position right above the vacuuming position D of the conveyor 6. When the operator depresses the packing-start switch over again, the apparatus sequentially repeats the packing operations.

When the absorbing elements 39 respectively press against fruits or vegetables 3 and then the contact surface 44a of these absorbing elements 39 come into contact with the absorbable surfaces of fruits 3 or vegetables 3, elastic members 64 deform these surfaces 44a so that these surfaces 44a can fully accommodate themselves and tightly adhere to the surfaces of fruits 3 or vegetables 3 without generating gap at all. As a result, when vacuuming air inside of absorbing elements 39, specific vacuuming force is applied to the absorbable surfaces of fruits 3 or vegetables 3 so that these can securely be vacuumed, thus allowing these fruits 3 or vegetables 3 to be transferred to the designated position smoothly.

When the packing operation is underway, fruits 3 or vegetables 3 vacuumed by the absorbing elements 39 are delivered into package 9 by causing the entire absorbing unit 8 to descend inself. When fruit 3 or vegetables 3 absorbed by the absorbing elements 39 in the external array come into contact with the upper edge of the package 9 and externally displace themselves, as shown in FIG. 13, these fruits 3 or vegetables 3 then come into contact with the internal bottom edge of the control frame 40 so that further displacement can be prevented. This allows the control frame 40 to effectively and smoothly deliver fruits 3 or vegetables 3 into package 9. As a result, any fruit 3 or vegetable 3 which displaces itself at the upper edge of the package 9 cannot be disengaged from the absorbing elements 39, thus securely preventing fruits 3 or vegetables 3 to fall down themselves to interrupt the packing operation.

Furthermore, since the directions and postures of these fruits 3 or vegetables 3 can correctly be arranged by spreading intervals between cups 22 in the lengthwise and widthwise direction, fruit packing operation can be executed smoothly.

Figure 18:
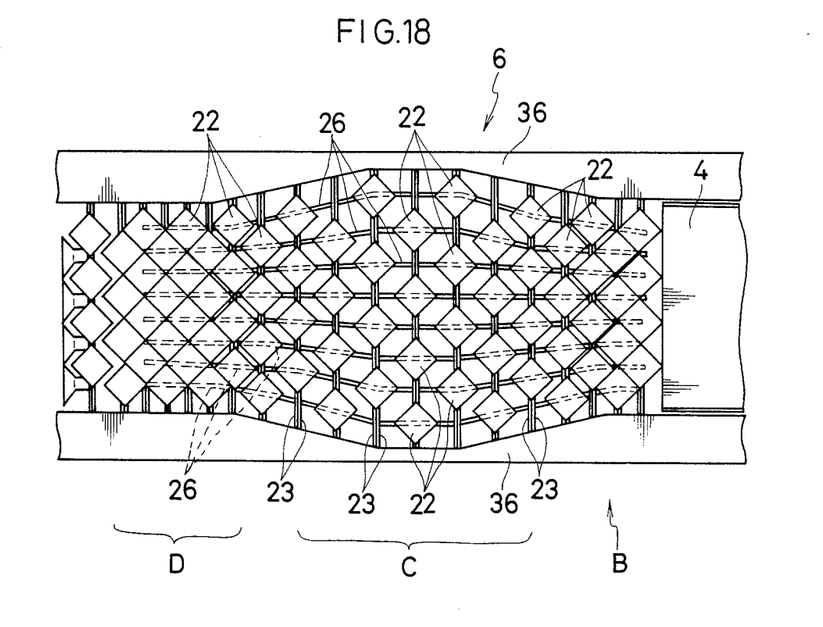
FIG. 18 is the plan denoting the fruits/vegetables conveyor belt on which a number of cups are disposed in multiple pattern.

FIG. 18 denotes the fruit aligning and packing device used for packing fruits 3 or vegetables 3 in the multiple zigzag like formation. Cups 22 having a corner being disposed in the fruit-conveying direction are disposed in the multiple zigzag like formation so that intervals between these cups are contracted when cups 22 in the lenghwise direction come close to each other, and thus, compared to those cups disposed in the multiple square formation, longer vertical guide members 26 are needed. These vertical guide members 26 allow cups 22 to depart from each other in the width direction in the same way as is done by those vertical guide members 26 dealing with those cups 22 disposed in the multi square formation mentioned above, thus deleting detailed description here.

Those adjoining cups 22 which are disposed in the multiple zigzag formation spread themselves by intervals wider than those which are disposed in the multiple square formation. This in turn provides substantial gap enough for inserting fingers between adjoining fruits 3 or vegetables 3 even when mounting large-size fruits 3 or vegetables 3 on these cups 22, thus allowing operator to easily correct the direction and posture of these fruits or vegetables as required.

The relationship between the fundamental constitution of the invention and the constituents used for the preferred embodiment of the apparatus is described below.

Endless belt of the conveyor used for the invention substantially corresponds to the chain 24 employed for implementing the preferred embodiment.

Fruit-conveying belt of the invention substantially corresponds to the conveyor 6 of the preferred embodiment.

Means for varying the width of cups in rank of the invention substantially corresponds to the conveyor 6 of the preferred embodiment.

Means for varying the length of the chain 24 of the invention substantially corresponds to the guide rollers 33, control members 34, and the fifth sprocket, which are respectively used for the preferred embodiment.

Elastic member of the absorbing elements 39 of the invention substantially corresponds to the elastic member 64 and the brush 65 which are respectively used for the preferred embodiment.

It should be understood that the spirit and scope of the present invention are not confined to those constituents employed for implementing the preferred embodiments described above.

What is claimed is:

1. An apparatus for automatically aligning and packing fruits or vegetables, which is provided with means for conveying fruits or vegetables in the position next to means for feeding these fruits or vegetables and an absorbing unit moving itself between the vacuuming position of said fruit-conveying means and the following fruit-packing position; wherein said fruit-conveying means is provided with a plurality of supporting shafts installed at specific intervals in the lengthwise direction of endless conveyor belts between said plurality of endless belts installed in parallel with each other in loose condition so that intervals between said supporting shafts can be varied as required; said shafts respectively support a plurality of cups for accommodating fruits or vegetables which are respectively movable in the direction of the driving shaft so that both said supporting shafts and cups integrally make up a fruit-conveying belt; wherein said apparatus is further comprised of;

means for varying width of ranks of cups which is provided beneath fruit-conveying members of said fruit-conveying members of said fruit-conveying belt to cause said cups to depart from each other in the width direction at equal intervals at the fruit-posture-correcting position and return to the predetermined adjoining state at the fruit/vegetable vacuuming position; and means for varying length of endless conveyor belt provided on both sides of said fruit-conveying belt to cause said endless conveyor belt to spread itself in order to allow said cups to depart from each other in the conveying direction at equal intervals at the fruit-posture-correcting position and also to cause said endless conveyor belt to contract itself so that intervals between said cups can become narrow at the fruit/vegetable vacuuming position.

2. The apparatus for automatically aligning and packing fruits or vegetables defined in claim 1, wherein said fruit-feeding means is comprised of the first and second feeding belts, in which said second feeding belt is installed to a position close to the terminating position of said first feeding belt and a step generated by difference of height between said first and second feeding belts for causing fruits or vegetables to invert their postures.

3. The apparatus for automatically aligning and packing fruits or vegetables defined in claim 1, wherein said fruit-feeding means is further comprised of a linear member which is set in the direction of the width of conveying surface of fruit-feeding conveyor at a height position where said linear member is engaged with calyces of fruits or vegetables mounted on said conveyor.

4. The apparatus for automatically aligning and packing fruits or vegetables defined in claim 1, wherein said absorbing unit is comprised of a plurality of absorbing elements respectively vacuuming fruits or vegetables, while surfaces of said absorbing elements coming into contact and vacuuming fruits or vegetables are provided with thin thickness so that these surfaces can accommodate themselves to shapes and surfaces characteristic of fruits or vegetables, and a plurality of elastic members set to the back surfaces of said contact and vacuum surfaces for energizing said contact and vacuum surfaces against fruits or vegetables.

5. The apparatus for automatically aligning and packing fruits or vegetables defined in claim 1, wherein said absorbing unit is further comprised of a control frame controlling elastic displacement of fruits or vegetables vacuumed by those absorbing elements in the external periphery of arrays of a plurality of elastically displaceable absorbing elements which are disposed in specific positions corresponding to the designated fruit-packing position.

* * * * *